US011725081B2

United States Patent
Fukui et al.

(10) Patent No.: US 11,725,081 B2
(45) Date of Patent: Aug. 15, 2023

(54) ORGANOPOLYSILOXANE CURED FILM, USE THEREOF, AND METHOD FOR PRODUCING SAME

(71) Applicant: DOW TORAY CO., LTD., Tokyo (JP)

(72) Inventors: Hiroshi Fukui, Ichihara (JP); Yoichi Kaminaga, Ichihara (JP); Takeaki Tsuda, Ichihara (JP)

(73) Assignee: DOW TORAY CO., LTD., Tokyo (JP)

( * ) Notice: Subject to any disclaimer, the term of this patent is extended or adjusted under 35 U.S.C. 154(b) by 110 days.

(21) Appl. No.: 17/260,118

(22) PCT Filed: Jul. 16, 2019

(86) PCT No.: PCT/JP2019/027836
§ 371 (c)(1),
(2) Date: Jan. 13, 2021

(87) PCT Pub. No.: WO2020/017480
PCT Pub. Date: Jan. 23, 2020

(65) Prior Publication Data
US 2021/0238365 A1 Aug. 5, 2021

(30) Foreign Application Priority Data
Jul. 17, 2018 (JP) .................. 2018-133908

(51) Int. Cl.
*C08G 77/00* (2006.01)
*B32B 27/06* (2006.01)
*B32B 27/28* (2006.01)
*C08G 77/20* (2006.01)
*C08J 5/18* (2006.01)
*C09J 7/38* (2018.01)

(52) U.S. Cl.
CPC .............. *C08G 77/70* (2013.01); *B32B 27/06* (2013.01); *B32B 27/283* (2013.01); *C08G 77/20* (2013.01); *C08J 5/18* (2013.01); *C08J 2383/07* (2013.01); *C09J 7/38* (2018.01); *C09J 2483/00* (2013.01)

(58) Field of Classification Search
CPC ....... C08J 5/18; C08J 2383/04; B32B 27/283; C09J 2483/00
See application file for complete search history.

(56) References Cited

U.S. PATENT DOCUMENTS

| | | | | |
|---|---|---|---|---|
| 5,158,906 A | * | 10/1992 | Huang | H01L 21/76248 117/923 |
| 5,349,037 A | * | 9/1994 | Fujiki | C08L 83/00 528/42 |
| 2004/0265599 A1 | | 12/2004 | Ushio et al. | |
| 2015/0344671 A1 | * | 12/2015 | Furukawa | H01L 41/083 310/365 |
| 2017/0212287 A1 | * | 7/2017 | Lee | C08K 5/12 |
| 2019/0127531 A1 | | 5/2019 | Fukui et al. | |

FOREIGN PATENT DOCUMENTS

| | | | | |
|---|---|---|---|---|
| JP | 2003176462 A | | 6/2003 | |
| JP | 2012078144 A | | 4/2012 | |
| WO | WO-2011002101 A2 | * | 1/2011 | C08L 83/00 |
| WO | 2017183541 A1 | | 10/2017 | |

OTHER PUBLICATIONS

English translation of International Search Report for PCT/JP2019/027836 dated Oct. 8, 2019, 1 page.
Machine assisted English translation of JP2003176462A obtained from https://patents.google.com/patent on Feb. 18, 2021, 10 pages.
Machine assisted English translation of JP2012078144A obtained from https://patents.google.com/patent on Feb. 18, 2021, 7 pages.

* cited by examiner

*Primary Examiner* — Alicia J Weydemeyer
(74) *Attorney, Agent, or Firm* — Warner Norcross + Judd LLP

(57) ABSTRACT

An organopolysiloxane cured film which can be made thin, has an extremely low number of defects on a surface and inside of the film, and exhibits high dielectric breakdown strength with regard to a load voltage is provided. Also provided are applications thereof and a method of manufacturing. The organopolysiloxane cured film has an average thickness within a range of 1 to 200 μm. In general, the number of surface defects is 0 to 1, and the number of internal defects is 0 to 20, when measuring the number of surface defects using optical means in an arbitrary position on the organopolysiloxane cured film with a unit area of 15 mm×15 mm. The organopolysiloxane cured film may be obtained by a rolling step in a clean room or the like, or may be obtained by curing between separators provided with a release layer.

14 Claims, No Drawings

ORGANOPOLYSILOXANE CURED FILM, USE THEREOF, AND METHOD FOR PRODUCING SAME

CROSS-REFERENCE TO RELATED APPLICATIONS

This application is the U.S. National Stage of International Application No. PCT/JP2019/027836 filed on 16 Jul. 2019, which claims priority to and all advantages of Japanese Application No. 2018-133908 filed on 17 Jul. 2018, the content of which is incorporated herein by reference.

TECHNICAL FIELD

The present invention relates to an organopolysiloxane cured film with low surface and internal defects and excellent dielectric breakdown strength, an application thereof, and a method of manufacturing.

BACKGROUND ART

Organopolysiloxane cured products having a polysiloxane skeletal structure have excellent transparency, electrical insulation, heat resistance, cold resistance, and the like, can have improved electrical activity, if desired, by introducing a high dielectric functional group such as a fluoroalkyl group or the like, and can be easily processed into a film or sheet. Therefore, the organopolysiloxane cured products used in various applications such as adhesive films used in various electric and electronic devices and electroactive films used in actuators and other transducer devices are classified into a hydrosilylation reaction curing type, condensation reaction curing type, peroxide curing type, and the like, based on the curing mechanism. Organopolysiloxane cured films using hydrosilylation reaction curing type curable organopolysiloxane compositions are widely used because they are quick curing when left at room temperature or heated, and there is no generation of byproducts.

In particular, the organopolysiloxane cured film tends to require formability as a thin film with a thickness of 100 μm or less, in addition to a high degree of uniformity, when used as an electronic material such as a touch panel or the like, an electronic component for a displaying device, and particularly as a transducer material for a sensor, actuator, or the like. However, when the organopolysiloxane cured product is molded into a thin film, a defect may occur on a surface and inside of the film due to fine voids, airborne dust, and the like. When the organopolysiloxane cured film containing a large number of the defects is used under a high load voltage, dielectric breakdown may occur in the defects. Thus, there was a problem where various properties expected of the organopolysiloxane cured film, such as high optical transparency, electrical insulation, heat resistance, cold resistance, and the like, cannot be fully demonstrated.

On the other hand, in Patent Document 1, the applicants of the present application have proposed providing a high dielectric film having excellent uniformity and flatness in a width direction of the film, an application thereof, and a method of manufacturing. However, although the film is effective in achieving an organopolysiloxane cured film with excellent flatness by suppressing thickness variation and unevenness, there is still room for improving microscopic defects on the film surface or inside the film.

RELATED ART DOCUMENTS

Patent Documents

Patent Document 1: WO 2017/183541

SUMMARY OF THE INVENTION

Problem to be Solved by the Invention

In order to solve the aforementioned problem, an object of the present invention is to provide: an organopolysiloxane cured film which can be made thin, has an extremely low number of defects on a surface and inside of the film, and exhibits high dielectric breakdown strength with regard to a load voltage; an application thereof; and a method of manufacturing same.

Means for Solving the Problem

As a result of extensive studies to solve the aforementioned problem, the inventors discovered that the problem can be resolved by an organopolysiloxane cured film where the number of defects on a film surface per unit area, and preferably the number of defects inside the film per unit area are suppressed below a certain value, and the average thickness is within a range of 1 to 200 μm, thereby achieving the present invention.

In other words, an object of the present invention is achieved by:

[1] An organopolysiloxane cured film having an average thickness within a range of 1 to 200 μm, wherein the number of surface defects is within 0 to 1 when measuring the number of surface defects using optical means at an arbitrary position on the film with a unit area of 15 mm×15 mm.

[2] The organopolysiloxane cured film according to [1], wherein the number of internal defects is within a range of 0 to 20 when measuring the number of internal defects using optical means at an arbitrary position on the film with a unit area of 15 mm×15 mm.

An object of the present invention is preferably achieved by the following organopolysiloxane cured films.

[3] The organopolysiloxane cured film according to [1] or [2], wherein the dielectric breakdown strength measured at room temperature is within a range of 60 V/μm to 200 V/μm.

[4] The organopolysiloxane cured film according to any one of [1] to [3], which is essentially transparent, wherein the average thickness is within a range of 1 to 150 μm.

An object of the present invention is particularly preferably achieved by a film obtained by a rolling process or a film flattened by curing between separators provided with a release layer. Furthermore, the organopolysiloxane cured film is preferably obtained by curing a hydrosilylation reaction curable organopolysiloxane composition. In other words, an object of the present invention is preferably achieved by the following organopolysiloxane cured films.

[5] The organopolysiloxane cured film according to any one of [1] to [4], obtained by rolling.

[6] The organopolysiloxane cured film according to any one of [1] to [5], wherein a surface is flattened by curing between separators having a release layer.

[7] The organopolysiloxane cured film according to any one of [1] to [6], made by curing a curable organopolysiloxane composition, including:

(A) an organopolysiloxane having a curing reactive group containing at least two carbon-carbon double bonds in a molecule;

(B) an organohydrogenpolysiloxane composition having at least two silicon-bonded hydrogen atoms in a molecule in an amount containing 0.1 to 2.5 moles of silicon-bonded hydrogen atoms with regard to a total amount of 1 mol of the carbon-carbon bonds in the composition; and (C) an effective amount of a hydrosilylation reaction catalyst.

[8] The organopolysiloxane cured film according to [7], wherein the component (A) is an organopolysiloxane mixture containing:

(a1) a straight chain or branched chain organopolysiloxane having an alkenyl group only at an end of a molecular chain; and (a2) an organopolysiloxane resin containing an alkenyl group having at least one branched siloxane unit in a molecule wherein the amount of vinyl (CH2=CH—) groups is within a range of 1.0 to 5.0 mass %.

Although optional, when the organopolysiloxane cured film according to an object of the present invention is used as an electroactive film (for example, a dielectric film) used in a transducer such as an actuator or the like, a high dielectric functional group may be introduced in the cured product. In other words, an object of the present invention is preferably achieved by the following organopolysiloxane cured films.

[9] The organopolysiloxane cured film according to [7] or [8], wherein a portion or all of component (A) or component (B) is an organopolysiloxane or organohydrogenpolysiloxane, having a high dielectric functional group.

[10] The organopolysiloxane cured film according to any one of [7] to [9], wherein a portion or all of the component (A) or component (B) is an organopolysiloxane or organohydrogenpolysiloxane having a fluoroalkyl group expressed by $(C_pF_{2p+1})$—R— (where R represents an alkylene group with 1 to 10 carbon atoms, and p represents an integer between 1 and 8).

Furthermore, an object of the present invention is achieved by the following inventions, which include an application of the organopolysiloxane cured film, a laminated body provided with the film, and an application thereof.

[11] Use of the organopolysiloxane cured film according to any one of [1] to [10] as an electronic material or as a member for a displaying device.

[12] A laminated body having a structure where the organopolysiloxane cured film according to any one of [1] to [10] is laminated onto a sheet-like substrate provided with a release layer.

[13] An electronic component or displaying device, containing the organopolysiloxane cured film according to any one of [1] to [10].

Furthermore, an object of the present invention is achieved by an invention of a method of manufacturing the organopolysiloxane cured film.

[14] A method of manufacturing the organopolysiloxane cured film according to any one of [1] to [10], including a step of applying a curable organopolysiloxane composition onto a substrate and then performing a rolling process prior to or after curing.

[15] A method of manufacturing the organopolysiloxane cured film according to any one of [1] to [10], including a step of curing the curable organopolysiloxane composition in a condition sandwiched between separators having a release layer.

Effects of the Invention

The present invention can provide: an organopolysiloxane cured film which can be made thin, has an extremely low number of defects on the surface and inside of the film, and exhibits high dielectric breakdown strength with regard to a load voltage; an application thereof; and a method of manufacturing. The organopolysiloxane cured film has various excellent properties expected of a silicone material, such as handling workability, transparency, heat resistance, and the like, is a film or sheet-like member suitable as an adhesive layer or dielectric layer of an electronic component or the like, and may have a function of a gel, an elastomer, or for optical bonding, or the like. More preferably, the organopolysiloxane cured film can be used as a film or sheet-like member with excellent dielectric breakdown strength when made into a thin film and under high voltage in applications as an electronic material, an electronic member for a displaying device such as a touch panel or the like, a transducer material such as an actuator, or the like.

DESCRIPTION OF THE PREFERRED EMBODIMENT

The organopolysiloxane cured film of the present invention is described in detail below.

[Thickness, Uniformity and Flatness]

The organopolysiloxane cured film of the present invention is a thin film, and the average thickness of the film is within a range of 1 to 200 µm, preferably 1 to 150 µm, and more preferably 1 to 100 µm. Herein, the average thickness of the film is an average value of the thickness at the center of the film. Preferably, the organopolysiloxane cured film is uniform and flat, and the difference between the thickness at an end and thickness at the center is within 5.0% in a width direction of the film. The average value of the thickness of the center of the film is more preferably within a range of 5 to 200 µm. The width direction of the film is a direction orthogonal to a length direction of the film, and generally refers to a direction orthogonal in a planar direction with regard to the direction that a curable organopolysiloxane composition, which is a raw material, is applied onto a substrate. Note that when the film is rolled, the rolling direction is the length direction, and the width direction of the film is a direction orthogonal thereto. For a quadrilateral or essentially quadrilateral film, the width direction of the film may be a direction orthogonal to a long axis direction, and for a square or essentially square film, the width direction may either be a direction orthogonal or a direction parallel to any side of the square film.

The organopolysiloxane cured film of the present invention has a difference (absolute value) between the thickness (µm) of an end and thickness (µm) of the center within 5.0%, preferably within 4.0%, and particularly preferably within 3.5%, in the width direction of the film. Note that the film is preferably a flat and uniform structure with essentially no unevenness on the surface, including rises at both ends. The maximum displacement (difference) of the thickness in the film width direction is preferably within 5.0%. The film is particularly preferably flat with essentially no unevenness, having a maximum displacement (difference) of the thickness of the entire film within 5.0%. In particular, a flat film has an advantage of being less prone to bubble entrainment, deformation and defects originating from unevenness between the films when not only a single layer, but a plurality of film layers are overlaid to form a uniform thick film layer.

The organopolysiloxane cured film of the present invention has an average thickness per film within a range of 1 to 200 µm. However, a plurality of films can be overlaid to form a laminated film exceeding 200 µm, which can be used to form an adhesive layer or dielectric layer. In particular, a dielectric film forming a dielectric layer obtained by laminating two or more films is included in the scope of the present invention.

[Film Size]

The organopolysiloxane cured film of the present invention preferably has a certain size (area). The film width is preferably 30 mm or more, and the film area is preferably 900 mm² or more. The film is, for example, an organopolysiloxane cured film with a size that is 30 mm square or larger. On the other hand, the organopolysiloxane cured film of the present invention may have a structure where a curable composition of a raw material is uniformly applied and cured even on a release layer, and therefore can be used without limitation in the length direction, even at a length where rolling is possible on a roll. Furthermore, it goes without saying that the organopolysiloxane cured film can be used by cutting into a desired size and shape.

[Number of Surface Defects on Film]

The organopolysiloxane cured film of the present invention has very few defects on the film surface at any point on the film. Herein, a defect on the film surface is a contamination site on the film surface due to voids originating from air bubbles and adhesion of dust, airborne dust, and the like. If a large number of defects is present, the uniformity of the film surface is impaired and microscopic defects are generated, which may cause dielectric breakdown at the site, particularly when the film is electrified by applying a high voltage. Note that surface defects, and particularly fine voids with diameters of several to several tens of μm may be difficult to visually confirm.

Specifically, the number of surface defects of the organopolysiloxane cured film of the present invention is within a range of 0 to 1, preferably 0 to 0.5, and more preferably 0 to 0.1 when measuring the number of surface defects using optical means at an arbitrary position on the film with a unit area of 15 mm×15 mm. When the number of surface defects exceeds the aforementioned upper limit, dielectric breakdown is more likely to occur when the film is electrified by applying a high voltage, and thus the dielectric breakdown strength of the entire film is significantly reduced.

Herein, the measurement of the number of defects using optical means is a method where light is irradiated from a light source with a certain level of illuminance onto the surface at a certain angle of incidence, the reflected light is detected by optical means such as a CCD camera or the like, and points with a certain signal threshold are counted as surface defects. Specifically, light is irradiated from a white LED light source installed at a position that is a certain distance (for example, 50 to 300 mm) from the film at a specific angle of incidence (for example, 10 to 60 degrees) such that the illuminance at a film position is constant. The specularly reflected light (light reflected at a reflection angle corresponding to the angle of incidence) is detected by a CCD camera having a 10 μm pixel size resolution at a scanning speed of 10 m/minute, installed at a position that is a certain distance (for example, 50 to 400 mm) from the film. The detected signal is differentiated in a scanning direction, and the number of defects having a specific signal threshold can be counted across the entire film roll and then converted into a number of defects within a range of the film with a unit area of 15 mm×15 mm. For example, the number of defects on the film surface can be identified by irradiating light from a white LED light source having a specific surface incidence angle onto the organopolysiloxane cured film and detecting the reflected light, using MaxEye. Impact (equipped with a CCD camera having a line speed of 10 m/min, a width resolution of 0.01 mm/pixel, and flow resolution of 0.01 mm/scan) manufactured by Futec Inc.

[Number of Internal Defects in Film]

The organopolysiloxane cured film of the present invention is a thin film, and therefore, the number of defects inside the film is also preferably suppressed. Specifically, the number of internal defects is within a range of 0 to 20, and preferably 0 to 15 when measuring the number of internal defects using optical means at an arbitrary position on the film with a unit area of 15 mm×15 mm. When the number of internal defects exceeds the aforementioned upper limit, dielectric breakdown is more likely to occur when the film is electrified by applying a high voltage, and thus the dielectric breakdown strength of the entire film is significantly reduced.

Similar to the defects of the film surface, the number of internal defects can be identified by measuring the number of defects using optical means. In this case, unlike measuring the surface defects, light is irradiated orthogonal to a lower portion of the film surface from a light source having a certain level of illuminance, the transmitted light is detected by optical means such as a CCD camera or the like, and points having a certain signal threshold are counted as surface defects. For example, the number of defects inside the film can be identified by irradiating light from a white LED light source so as to pass through the film in an orthogonal (directly above) direction from a lower portion of the organopolysiloxane cured film, and detecting the transmitted light using MaxEye. Impact (equipped with a CCD camera having a line speed of 10 m/min, a width resolution of 0.01 mm/pixel, and flow resolution of 0.01 mm/scan) manufactured by Futec Inc.

[Transparency]

The organopolysiloxane cured film of the present invention is essentially transparent when no coloring agent, filler with a large particle size, or the like is added, and can be used as a dielectric layer or adhesive layer in applications requiring transparency/visibility. Herein, "essentially transparent" means that a cured product forming a film with an average thickness of 1 to 200 μm is visually transparent, and transmittance of light at a wavelength of 450 nm is 80% or higher, based on a value for air of 100%. In the present invention, a preferred organopolysiloxane cured film is a thin film that is highly transparent, and preferably has an average thickness within a range of 1 to 150 μm, more preferably within a range of 1 to 100 μm, and particularly preferably a light transmittance of 90% or higher.

[Dielectric Breakdown Strength]

As described above, the organopolysiloxane cured film of the present invention has very few defects inside and on the surface. Therefore, even when a high voltage is applied to the film, a dielectric breakdown phenomenon caused by overvoltage due to voids and dust in the film, which are defects, is prevented from occurring. As a result, a high dielectric breakdown strength can be achieved. Note that "dielectric breakdown strength" in the present specification is a measure of the dielectric breakdown resistance of the film under an applied direct current or alternating current voltage, and the dielectric breakdown strength value or dielectric breakdown voltage value is obtained by dividing the applied voltage prior to dielectric breakdown by the thickness of the film. In other words, the dielectric breakdown strength in the present invention is measured in units of potential difference with regard to the units of film thickness (in the present invention, Volt/micrometer (V/μm)). The dielectric breakdown strength can be measured by an electrical insulating oil breakdown voltage testing device (for example, Portatest 100A-2 manufactured by Soken Co., Ltd., or the like) having a program conforming to a standard such as JIS 2101-82 or the like. At this time, in order to avoid variations in the measurement value of the dielectric breakdown strength at an arbitrary position of the film, the dielectric breakdown strength is measured in at least 10 arbitrary positions on the film, and the standard deviation value is preferably sufficiently low.

Specifically, the organopolysiloxane cured film of the present invention has a dielectric breakdown strength measured at room temperature that is within a range of 60 V/μm to 200 V/μm, and more preferably 70 V/μm to 100 V/μm. When the number of film surface and internal defects exceeds the aforementioned upper limit, the aforementioned dielectric breakdown strength may not be achieved. Furthermore, the entire organopolysiloxane cured film of the present invention is uniform, and contains almost no microscopic defects. Therefore, the standard deviation value of the dielectric breakdown strength is sufficiently low, and is within a range of 0.1 to 10.0 V/μm, and preferably 0.1 to 5.0 V/μm. When the number of film surface and internal defects exceeds the aforementioned upper limit, variations in the number of defects inside and on the surface of the film may increase, and there may be cases where the standard deviation value of the dielectric breakdown strength may exceed 10.0 V/μm. Thus, reliability of the obtained organopolysiloxane cured film is reduced.

[Specific Dielectric Constant]

In the organopolysiloxane cured film of the present invention, a high dielectric functional group such as a fluoroalkyl group or the like may be optionally introduced, and the specific dielectric constant of the entire film at 1 kHz and 25° C. can be easily designed to be 3 or higher. The specific dielectric constant can be designed by the number of high dielectric functional groups introduced, use of a high dielectric filler, or the like, and an organopolysiloxane cured film having a specific dielectric constant of 4 or higher, 5 or higher, or 6 or higher can be relatively easily obtained.

[Mechanical Properties]

The organopolysiloxane cured film of the present invention has a low number of microscopic surface and internal defects, and macroscopic mechanical properties such as hardness, tear strength, tensile strength, and the like are generally comparable to those of an organopolysiloxane cured film designed with similar chemical composition, film thickness, and shape. As an example, the organopolysiloxane cured product can be designed to have the following mechanical properties measured when heated and molded into a sheet having a thickness of 2.0 mm, based on JIS K 6249.

(1) The Young's modulus (MPa) at room temperature can be 10 MPa or less, particularly preferably within a range of 0.1 to 2.5 MPa.

(2) The tear strength (N/mm) at room temperature can be 1 N/mm or higher, particularly preferably within a range of 2 N/mm or higher.

(3) The tensile strength (MPa) at room temperature can be 1 MPa or higher, particularly preferably within a range of 2 MPa or higher.

(4) The elongation at break (%) can be 200% or higher, particularly preferably within a range of 200 to 1000%.

When the organopolysiloxane cured film of the present invention is used in an application as an electronic material such as a touch panel and the like, electronic member for a displaying device, and particularly a transducer material such as a sensor or the like, the shear storage modulus at 23° C. is preferably within a range of $10^3$ to $10^5$ Pa, and more preferably $$1.0 \times 10^3 \text{ to } 5.0 \times 10^4 \text{ Pa.}$$

As for other mechanical properties, the compressive residual strain (%) of the organopolysiloxane cured film is preferably less than 10%, more preferably less than 5%, and particularly preferably 4% or less. However, the organopolysiloxane cured film of the present invention can be designed as a material having a compressive residual strain (%) that is less than 3%.

Similarly, the organopolysiloxane cured film of the present invention preferably has a compression ratio (%) of 15% or higher, more preferably 18% or higher, and particularly preferable 20% or higher.

[Pressure-Sensitive Adhesive Strength]

When used as an adhesive or adhesive layer, the organopolysiloxane cured film of the present invention may be designed such that a desired pressure-sensitive adhesive strength is provided by using an organopolysiloxane resin or the like. For example, the pressure-sensitive adhesive strength thereof can be designed to be 5 N/m or higher or 10 N/m or higher, when a test piece where a polyethylene terephthalate (PET) substrate (thickness 50 μm) is adhered on both surfaces of an organopolysiloxane cured film with a thickness of 100 μm is peeled off at a rate of 300 mm/min at an angle of 180 degrees, in a 23° C., 50% humidity environment. Note that in practical use, if a pressure-sensitive adhesive strength can be provided to the substrate with the adhered organopolysiloxane cured film of the present invention, based on various treatments, or if an adhesive layer is not used, it goes without saying that the pressure-sensitive adhesive strength will be essentially non-existent, and thus an easily peelable organopolysiloxane cured film can be used.

[Organopolysiloxane Cured Product]

The organopolysiloxane cured product of the present invention is obtained by curing a curable organopolysiloxane composition so as to have the aforementioned thickness. The curing reaction mechanism is not particularly limited. Examples include: a hydrosilylation reaction curing type using an alkenyl group and a silicon atom-bonded hydrogen atom; a dehydration condensation reaction curing type or a dealcoholization condensation reaction curing type using a silanol group and/or a silicon atom-bonded alkoxy group; a peroxide curing reaction type using an organic peroxide; a radical reaction curing type using high energy ray irradiation on a mercapto group; and the like. It is desirable to use a hydrosilylation reaction curing type, a peroxide reaction curing type, a radical reaction curing type, or a combination thereof, because the entire composition is cured relatively quickly and the reaction can be easily controlled. These curing reactions proceed with heating, irradiating with high energy radiation, or a combination thereof.

In particular, an organopolysiloxane cured film having extremely few film surface and internal defects can be obtained by a manufacturing method described later, and therefore, a hydrosilylation reaction curing type curable organopolysiloxane composition is preferably used in the present invention.

A preferable organopolysiloxane cured film is obtained by curing a curable organopolysiloxane composition, containing:

(A) an organopolysiloxane having a curing reactive group containing at least two carbon-carbon double bonds in a molecule;

(B) an organohydrogenpolysiloxane composition having at least two silicon-bonded hydrogen atoms in a molecule in an amount containing 0.1 to 2.5 moles of silicon-bonded hydrogen atoms with regard to a total amount of 1 mol of the carbon-carbon bonds in the composition; and (C) an effective amount of a hydrosilylation reaction catalyst.

A more preferred organopolysiloxane mixture, contains:

(a1) a straight chain or branched chain organopolysiloxane having an alkenyl group only at an end of a molecular chain; and (a2) an organopolysiloxane resin containing an alkenyl group having at least one branched siloxane unit in a molecule where the amount of vinyl (CH2=CH—) groups is within a range of 1.0 to 5.0 mass %.

The aforementioned component (A) is an organopolysiloxane having a curing reactive group containing a carbon-carbon double bond, and examples include organopolysiloxanes in straight chain, branched chain, cyclic, or resin (network) organopolysiloxanes containing a curing reactive group in a molecule, selected from: vinyl groups, allyl group, butenyl groups, pentenyl groups, hexenyl groups, heptenyl groups, octenyl groups, nonenyl groups, decenyl groups, undecenyl groups, dodecenyl groups, and other alkenyl groups with 2 to 20 carbon atoms; 3-acryloxypropyl groups, 4-acryloxibutyl groups, and other groups containing an acryl; and 3-methacryloxypropyl groups, 4-methacryloxibutyl groups, and other groups containing a methacryl group. An organopolysiloxane having a curing reactive group containing a carbon-carbon double bond, selected from vinyl groups, allyl groups, and hexenyl groups is particularly preferable.

The organopolysiloxane serving as component (A) may contain a group selected from monovalent hydrocarbon groups that do not have a carbon-carbon double bond in a molecule, hydroxyl groups, and alkoxy groups. Furthermore, a portion of the hydrogen atoms of the monovalent hydrocarbon group may be substituted with a halogen atom or a hydroxyl group. Examples of the monovalent hydrocarbon groups having 1 to 12 carbon atoms include: alkyl groups such as methyl groups, ethyl groups, propyl groups, butyl groups, pentyl groups, hexyl groups, heptyl groups, octyl groups, nonyl groups, decyl groups, undecyl groups, and dodecyl groups; aryl groups such as phenyl groups, tolyl groups, xylyl groups, naphthyl groups, anthracenyl groups, phenanthryl groups, pyrenyl groups, and the like; aralkyl groups such as benzyl groups, phenethyl groups, naphthyl ethyl groups, naphthyl propyl groups, anthracenyl ethyl groups, phenanthryl ethyl groups, pyrenyl ethyl groups, and the like; and groups where a hydrogen atom of these aryl groups or aralkyl groups are substituted with a methyl group, ethyl group, or other alkyl group, a methoxy group, ethoxy group, or other alkoxy group), or halogen atom such as a chlorine atom, bromine atom, or the like). Note that when component (A) contains a hydroxyl group or the like, the component has condensation reactivity in addition to hydrosilylation reaction curability.

Preferably, component (A) may be an organopolysiloxane expressed by the following average composition formula:

$$R^1_a R^2_b SiO_{(4-a-b)/2}$$

or a mixture thereof.

In the formula, $R^1$ represents a curing reactive group containing a carbon-carbon double bond, $R^2$ represents a group selected from monovalent hydrocarbon groups that do not have a carbon-carbon double bond, hydroxyl groups, and alkoxy groups, and a and b represent numbers satisfying the following conditions: $1 \le a+b \le 3$ and $0.001 \le a/(a+b) \le 0.33$, and are preferably numbers satisfying the following conditions: $1.5 \le a+b \le 2.5$ and $0.005 \le a/(a+b) \le 0.2$. This is because the flexibility of the cured product increases when a+b are above the lower limit of the aforementioned range, while the mechanical strength of the cured product increases when a+b are below the upper limit of the range, and the mechanical strength of the cured product increases when a/(a+b) is above the lower limit of the range, while flexibility of the cured product increases when a/(a+b) is below the upper limit of the range.

Component (A) of the present invention is particularly preferably an organopolysiloxane mixture containing:

(a1) a straight chain or branched chain organopolysiloxane having an alkenyl group only at an end of a molecular chain; and (a2) an organopolysiloxane resin containing an alkenyl group having at least one branched siloxane unit in a molecule with an amount of vinyl (CH2=CH—) groups within a range of 1.0 to 5.0 mass %.

Component (a1) is a straight chain or branched chain organopolysiloxane having a siloxane unit expressed by $$(Alk)R^2_2SiO_{1/2}$$

(where Alk represents an alkenyl group having two or more carbon atoms) at an end of a molecular chain, and where other siloxane units are essentially only a siloxane unit expressed by $R^2_2SiO_{2/2}$. Note that $R^2$ represents the same group as described above. Furthermore, the degree of siloxane polymerization of component (A1-1) is within a range of 7 to 1002 including terminal siloxane units, and may be within a range of 102 to 902. Such a component (A1-1) is particularly preferably a straight chain organopolysiloxane where both ends of the molecular chain are blocked with a siloxane unit expressed by $(Alk)R^2_2SiO_{1/2}$.

Component (a2) is an organopolysiloxane resin containing an alkenyl group, and an example thereof includes an organopolysiloxane resin containing an alkenyl group expressed by the following formula.

Average unit formula:
$$RSiO_{3/2})o(R_2SiO_{2/2})p(R_3SiO_{1/2})q(SiO_{4/2})r(XO_{1/2})s$$

In the formula, R represents a group selected from alkenyl groups and monovalent hydrocarbon groups that do not have a carbon-carbon double bond, and X represents a hydrogen atom or an alkenyl group having 1 to 3 carbon atoms. However, of all Rs, R is an alkenyl group at least in a range where the amount of vinyl (CH2=CH—) groups in the organopolysiloxane resin satisfies a range of 1.0 to 5.0 mass %, and at least a portion of Rs in the siloxane unit expressed by $RSiO_{1/2}$ are particularly preferably alkenyl groups.

In the formula, (o+r) is a positive integer, p is 0 or a positive integer, q is 0 or a positive integer, s is 0 or a positive integer, p/(o+r) is a number within a range of 0 to 10, q/(o+r) is a number within a range of 0 to 5, (o+r)/(o+p+q+r) is a number within a range of 0.3 to 0.9, and s/(o+p+q+r) is a number within a range of 0 to 0.4.

A particularly preferable example of component (a2) includes an MQ organopolysiloxane resin containing an alkenyl group expressed by

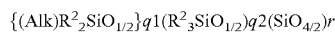

(where Alk and $R^2$ represent the same groups as described above, q1+q2+r is a number within a range of 50 to 500, (q1+q2)/r is a number within a range of 0.1 to 2.0, and q2 is a number of a range where the number of vinyl ($CH_2=CH-$) groups in the organopolysiloxane resin satisfies a range of 1.0 to 5.0).

Using component (a1) with an alkenyl group only at an end of the molecular chain and component (a2) as an organopolysiloxane resin, having a certain number of alkenyl groups can provide a curing reaction product with excellent curability as an entire composition and having excellent flexibility and mechanical strength, and can provide an organopolysiloxane cured film that is particularly suitable for an adhesive layer or dielectric layer in the aforementioned electronic components and the like.

Component (B) is an organohydrogenpolysiloxane having at least two silicon-bonded hydrogen atoms in a molecule, and is a component that functions as a crosslinking agent for component (A).

Examples of component (B) include 1,1,3-3-tetramethyldisiloxane, 1,3,5,7-tetramethyl cyclotetrasiloxane, tris(dimethylhydrogensiloxy)methylsilane, tris(dimethylhydrogensiloxy)phenylsilane, methylhydrogenpolysiloxanes blocked at both ends of a molecular chain with a trimethylsiloxy group, dimethylsiloxane/methylhydrogensiloxane copolymers blocked at both ends of a molecular chain with a trimethylsiloxy group, dimethylpolysiloxane blocked at both ends of a molecular chain with a dimethylhydrogensiloxane group, dimethylsiloxane/methylhydrogensiloxane copolymers blocked at both ends of a molecular chain with a dimethylhydrogensiloxane group, methylhydrogensiloxane/diphenylsiloxane copolymers blocked at both ends of a molecular chain with a trimethylsiloxy group, methylhydrogensiloxane/diphenylsiloxane/dimethylsiloxane copolymers blocked at both ends of a molecular chain with a trimethylsiloxy group, hydrolytic condensates of a trimethylsilane, copolymers containing $(CH_3)_2HSiO_{1/2}$ units and $SiO_{4/2}$ units, copolymers containing $(CH_3)_2HSiO_{1/2}$ units, SiO4/2 units, and $(C_6H_5)SiO_{3/2}$ units, copolymers containing $(CH_3)_2HSiO_{1/2}$ units and $CH_3SiO_{3/2}$ units, and mixtures of two or more types thereof.

The amount of component (B) used is preferably an amount where the silicon-bonded hydrogen atoms are within a range of 0.1 to 10 mols, more preferably 0.1 to 5.0 mols, and particularly preferably 0.1 to 2.5 mols, with regard to 1 mol of carbon-carbon double bonds in component (A) of the composition. Using an amount of component (B) that is less than the lower limit may cause curing defects. When the amount of component (B) exceeds the upper limit, mechanical strength of the cured product may be too high, and the desired physical properties of an adhesive layer or dielectric layer may not be obtainable. However, in order to improve the adhesive strength of the organopolysiloxane cured film of the present invention to glass or other adherend or the like, use of silicon-bonded hydrogen atoms in a range exceeding 20 mols with regard to 1 mol of carbon-carbon double bonds in component (A) is not hindered.

Component (C) is a catalyst that promotes a hydrosilylation reaction between component (A) and component (B). Examples include platinum based catalysts, rhodium based catalysts, palladium based catalysts, nickel based catalysts, iridium based catalysts, ruthenium based catalysts, and iron based catalysts. Platinum based catalysts are preferable. Examples of the platinum based catalyst include platinum based compounds, such as platinum fine powders, platinum black, platinum-supporting silica fine powders, platinum-supporting activated carbon, chloroplatinic acids, alcohol solutions of chloroplatinic acids, olefin complexes of platinum, alkenylsiloxane complexes of platinum, and the like. Alkenylsiloxane complexes of platinum are particularly preferable. Examples of the alkenylsiloxane include: 1,3-divinyl-1,1,3,3-tetramethyldisiloxane; 1,3,5,7-tetramethyl-1,3,5,7-tetravinylcyclotetrasiloxane; alkenyl siloxanes obtained by substituting a portion of methyl groups of the alkenylsiloxanes with an ethyl group, a phenyl group, or the like; and alkenylsiloxanes obtained by substituting a portion of vinyl groups of these alkenylsiloxanes with an allyl group, a hexenyl group, or the like. The platinum-alkenyl siloxane complex has favorable stability, and therefore 1,3-divinyl-1,1,3,3-tetramethyldisiloxane is particularly preferable. Furthermore, the stability of the platinum-alkenylsiloxane complex can be improved. Therefore, 1,3-divinyl-1,1,3,3-tetramethyldisiloxane, 1,3-diallyl-1,1,3,3-tetramethyldisiloxane, 1,3-divinyl-1,3-dimethyl-1,3-diphenyldisiloxane, 1,3-divinyl-1,1,3,3-tetraphenyldisiloxane, and 1,3,5,7-tetramethyl-1,3,5,7-tetravinylcyclotetrasiloxane, or other alkenylsiloxane or dimethylsiloxane oligomers or other organosiloxane oligomers are preferably added to the complex, and an alkenylsiloxane is particularly preferably added to the complex.

The amount of component (C) used is an effective amount and is not particularly limited so long as the amount promotes curing of the curable organopolysiloxane composition of the present invention. Specifically, in mass units, metal atoms in the catalyst are of an amount within a range of 0.01 to 1,000 ppm, and preferably, the platinum metal atoms in component (C) are of an amount within a range of 0.1 to 500 ppm, with regard to the sum (100 mass % as a whole) of components (A) to (C). This is because when the amount of component (C) is less than the lower limit of the aforementioned range, curing may be insufficient. Moreover, exceeding the upper limit of the range may be uneconomical and may adversely affect transparency, such as coloring of the obtained cured product and the like.

[(D) Solvent]

The curable organopolysiloxane composition according to the present invention can be subjected to a curing reaction as is, but on the other hand, when the composition or a portion of components thereof (for example, organopolysiloxane) is a solid or a viscous liquid, an organic solvent can be used if necessary in order to improve miscibility and handling properties. In particular, when the curable organopolysiloxane composition of the present invention is applied in the form of a film, the viscosity may be adjusted using a solvent in a range where the overall viscosity is 100 to 50,000 mPa·s, and when diluted with a solvent, use is possible within a range of 0 to 2000 mass parts with regard to the sum (100 mass parts) of components (A) to (C). In other words, in the composition of the present invention, the amount of solvent (D) may be 0 mass parts, which is preferable. In particular, by selecting a polymer with a low degree of polymerization for the curable organopolysiloxane composition of the present invention, a solvent-free design is possible, and residue of a fluorinated solvent, organic solvent, or the like will not remain in the film obtained after curing, which has advantages of eliminating a problem with environmental impact and effects of the solvent on an electronic device.

The type of organic solvent used herein is not particularly limited, so long as the solvent is a compound capable of dissolving all or a portion of the components of the composition. A type having a boiling point of 80° C. or higher and less than 200° C. is preferably used. Examples include i-propyl alcohol, t-butyl alcohol, cyclohexanol, cyclohexanone, methyl ethyl ketone, methyl isobutyl ketone, toluene, xylene, mesitylene, 1,4-dioxane, dibutyl ether, anisole, 4-methyl anisole, ethyl benzene, ethoxy benzene, ethylene glycol, ethylene glycol dimethyl ether, ethylene glycol diethyl ether, 2-methoxy ethanol (ethylene glycol monomethyl ether), diethylene glycol dimethyl ether, diethylene glycol monomethyl ether, 1-methoxy-2-propyl acetate, 1-ethoxy-2-propyl acetate, octamethyl cyclotetrasiloxane, hexamethyl disiloxane, and other non-halogen solvents, trifluoromethyl benzene, 1,2-bis (trifluoromethyl) benzene, 1,3-bis (trifluoromethyl) benzene, 1,4-bis (trifluoromethyl) benzene, trifluoromethyl chlorobenzene, trifluoromethyl fluorobenzene, hydrofluoroethers, and other halogen solvents. The organic solvent can be used independently or as a mixture of two or more types thereof. Note that as the amount of fluoroalkyl groups in the curable composition increases, the ratio of the halogen based solvent used must be increased.

The amount of the organic solvent used herein is preferably within a range of 0 to 2,000 mass parts, more preferably 5 to 500 mass parts, and even more preferably 10 to 300 mass parts, based on the sum of components (A) to (C) being 100 mass parts. Note that depending on the application of the cured film of the present invention, the amount of the organic solvent is essentially 0 mass parts, and thus the film is solvent-free.

The viscosity of the curable organopolysiloxane composition of the present invention at 25° C. is not particularly limited, but is preferably within a range of 100 to 500,000 mPa·s, more preferably 300 to 100,000 mPa·s, and particularly 1,000 to 10,000 mPa·s. In order to achieve the preferred viscosity range, the amount of the organic solvent used can be adjusted.

[Introduction of Dielectric Functional Group]

When the organopolysiloxane cured film of the present invention is used as an electroactive film (for example, a dielectric film) used in a transducer such as an actuator or the like, a high dielectric functional group may be introduced to the cured product. However, even an organopolysiloxane cured film that does not contain a high dielectric functional group can be used as an electroactive film Note that WO2014/105959 and the like by the present applicants propose, for example, introducing high dielectric functional groups and improving the specific dielectric constant.

Introduction of a high dielectric functional group can be performed by using an organopolysiloxane or organohydrogenpolysiloxane having a high dielectric functional group as a portion or all of component (A) or component (B), or by adding an organic additive having a high dielectric functional group, a non-reactive organosilicon compound having a high dielectric functional group, or the like to the curable composition. From the perspective of improving miscibility with the curable composition and the specific dielectric constant of the cured product, 10 mol % or more, preferably 20 mol % or more, and more preferably 40 mol % or more of all substitution groups on silicon atoms in the organopolysiloxane or organohydrogenpolysiloxane, which is component (A) or component (B), are substituted by a high dielectric functional group.

The type of the high dielectric functional group introduced to the organopolysiloxane cured film is not particularly limited, and examples include: a) halogen atoms and groups containing a halogen atom as represented by 3,3,3=trifluoropropyl groups and the like; b) groups containing a nitrogen atom as represented by cyanopropyl groups and the like; c) groups containing an oxygen atom as represented by carbonyl groups and the like; d) heterocyclic groups such as imidazole groups and the like; e) groups containing a boron atom such as borate ester groups and the like; f) groups containing phosphorus such as phosphine groups and the like; and g) groups containing a sulfur atom such as thiol groups and the like. Halogen atoms including a fluorine atom and groups containing only a halogen atom are preferably used.

In the present invention, a fluoroalkyl group expressed by $(C_pF_{2p+1})$—R— (R represents an alkylene group having 1 to 10 carbon atoms, and p represents an integer of 1 to 8) is preferably introduced as the high dielectric functional group to a portion or all of component (A) or component (B). The fluoroalkyl group provides a product having an excellent specific dielectric constant, and provides a cured product with excellent transparency because of the components having a fluoroalkyl atom, which improves the compatibility of the components. Specific examples of the fluoroalkyl group include trifluoropropyl groups, pentafluorobutyl groups, heptafluoropentyl groups, nonafluorohexyl groups, undecafluoroheptyl groups, tridecafluorooctyl groups, pentadecafluorononyl groups, and heptadecafluorodecyl groups. Of these, from the perspective of the dielectric properties, economy, ease of manufacturing, and moldability of the obtained curable organopolysiloxane composition, a group where p=1, in other words, a trifluoropropyl group, is preferable.

In addition to the aforementioned components, other components may be added, if necessary, to the curable organopolysiloxane composition according to the present invention so long as the object of the present invention is not impaired. Examples of other components include hydrosilylation reaction inhibitors, mold release agents, insulating additives, adhesion improving agents, heat resistance improving agents, fillers, pigments, and various other conventionally known additives. For example, an inorganic filler can be added for the purpose of adjusting the overall viscosity or improving functionality, such as improving dielectric properties and the like.

[Hydrosilylation Reaction Inhibitor]

A hydrosilylation reaction inhibitor is added to suppress a crosslinking reaction from occurring between components (A) and (B), extend work life at ambient temperature, and improve storage stability. Therefore, for practical purposes, a hydrosilylation reaction inhibitor that inhibits the curable composition of the present invention is a preferable component.

Examples of the hydrosilylation reaction inhibitor include acetylenic compounds, ene-yne compounds, organic nitrogen compounds, organic phosphorus compounds, and oxime compounds. Specific examples include: alkyne alcohols such as 3-methyl-1-butyne-3-ol, 3,5-dimethyl-1-hexyne-3-ol, 3-methyl-1-pentyne-3-ol, 1-ethynyl-1-cyclohexanol, phenyl butanol, and the like; ene-yne compounds such as 3-methyl-3-pentene-1-yne, 3,5-dimethyl-1-hexyne-3-yne, and the like; methylalkenylcyclosiloxanes such as 1,3,5,7-tetramethyl-1,3,5,7-tetravinylcyclotetrasiloxane, 1,3,5,7-tetramethyl-1,3,5,7-tetrahexenylcyclotetrasiloxane, and the like; as well as benzotriazoles.

The amount of the hydrosilylation reaction inhibitor added is an effective amount for extending the working life at ambient temperature and improving the storage stability of the present invention. Normally, the range is 0.001 to 5 mass % and preferably 0.01 to 2 mass % per 100 mass % of component (A), but appropriate selection is possible based on the type of the present component, the performance and amount of the platinum based catalyst, the amount of alkenyl groups in component (A), the number of silicon atom-bonded hydrogen atoms in component (B), and the like.

[Filling Material]

In the curable organopolysiloxane composition of the present invention, a filling material may or may not be used, as desired. If a filler is used, either or both of the inorganic filler and organic filler can be used. The type of the filler used is not particularly limited, and examples include high dielectric fillers, conductive fillers, insulating fillers, and reinforcing fillers. One or more types thereof can be used. In particular, the composition of the present invention can contain one or more fillers selected from a group consisting of high dielectric fillers, conductive fillers, insulating fillers, and reinforcing fillers, in order to adjust the viscosity and provide functionality, so long as transparency, coatability, and handling workability are not impaired. From the perspective of improving mechanical strength, at least one or more reinforcing fillers are particularly preferably added. In particular, a portion or all of the filler may be surface treated with one or more surface treating agents.

One or more fillers may be used. The shape thereof is not particularly restricted, and any arbitrary shape including a particle shape, plate shape, needle shape, fibrous shape, and the like can be used. If the shape of the filler is particulate, the particle size of the filler is not particularly limited, and, for example, when measuring using a laser beam diffraction method or a dynamic light scattering method, the volume average particle size can be, for example, within a range of 0.001 to 500 μm. Furthermore, depending on the intended purpose of the filler, the volume average particle size of the filler can be 300 μm or less, 200 μm or less, 100 μm or less, 10 μm or less, or 0.01 μm or more, 0.1 μm or more, or 1 μm or more. If the shape of the filler is an anisotropic shape such as a plate shape, needle shape, or fibrous shape, the aspect ratio of the filler can be 1.5 or higher, 5 or higher, or 10 or higher. When fine particles having a volume average particle size of 0.01 μm or less and a maximum particle size of 0.02 μm or less are used, a cured product having substantially high transparency, and particularly an adhesive film or electroactive layer film, can be manufactured.

[Reinforcing Filling Material]

In the present invention, from the perspective of the mechanical strength of the cured product, a preferred filling material is one or more type of reinforcing inorganic fine particles having an average primary particle size of less than 50 nm. Examples thereof include fumed silica, wet silica, ground silica, calcium carbonate, diatomaceous earth, finely ground quartz, various metal oxide powders other than alumina/zinc oxide, glass fibers, carbon fibers, and the like. Furthermore, these may be treated with various surface treating agents described later. Of these, silica is recommended.

Preferable examples thereof include: hydrophilic or hydrophobic fumed silica with an average primary particle size that is 10 nm or less. The particles are partially aggregated, and the specific surface area thereof is 50 $m^2/g$ or more and 300 $m^2/g$ or less, from the perspective of improving mechanical strength. Furthermore, from the perspective of improving dispersibility, the fumed silica is preferably treated with silazane or a silane coupling agent described later. One type of the reinforcing inorganic particles may be used independently, or two or more types may be used in combination.

When reinforcing inorganic fine particles are added into the composition, the dynamic strength and dielectric breakdown strength of the organopolysiloxane cured product (hereinafter, simply referred to as "cured product") obtained by curing the curable organopolysiloxane composition according to the present invention can be increased. The added amount of reinforcing inorganic fine particles is preferably within a range of 0.1 to 30 mass %, and more preferably 0.1 to 10 mass %, with regard to the curable organopolysiloxane composition. If the adding amount is outside the aforementioned preferable range, the effects obtained by adding inorganic particles may not be obtained or the moldability of the curable organopolysiloxane composition may be reduced.

A portion or all of the inorganic fine particles (irrespective of the particle size, function, and the like) used in the curable organopolysiloxane composition according to the present invention may be surface treated with one or more surface treating agents. The type of the surface treatment is not particularly limited, and examples thereof include hydrophilic treatment or hydrophobic treatment. Hydrophobic treatment is preferable. Hydrophobically treated inorganic fine particles can be used so as to be dispersed at a high filling rate in the organopolysiloxane composition. Furthermore, an increase in the viscosity of the composition is inhibited, and thus moldability is improved.

The surface treatment can be performed by treating (or coating) the inorganic fine particles with a surface treating agent. Examples of a hydrophobic surface treating agent include at least one surface treating agent selected from the group consisting of organic titanium compounds, organic silicon compounds, organic zirconium compounds, organic aluminum compounds, and organic phosphorus compounds. The surface treating agent may be used independently or two or more types may be used in combination. Of the surface treating agents, an organic silicon compound and particularly silazanes, silanes, siloxanes, and polysiloxanes are preferably used, and those with a silazane, alkyltrialkoxysilane, or trialkoxysilylpolydimethylsiloxane at one end are most preferably used.

The amount of the surface treating agent with regard to the total amount of inorganic fine particles is preferably within a range of 0.1 mass % or higher and 10 mass % or less, and more preferably within a range of 0.3 mass % or higher and 5 mass % or less. Note that the treatment amount is preferably the feed ratio of inorganic particles to the surface treating agent, and excess treating agents are preferably removed after treatment.

[Other Functional Filling Materials]

Examples of other functional filling materials include dielectric inorganic fine particles, conductive inorganic fine particles, insulating inorganic fine particles, and thermally conductive inorganic fine particles. One or more types selected from these microparticles can be used in the composition of the present invention. Note that the inorganic fine particles simultaneously have two or more functions including functioning as a reinforcing filling material, or the like.

Examples of preferred dielectric inorganic fine particles include one or more inorganic fine particles selected from a group consisting of composite metal oxides where a portion of barium and titanium sites of titanium oxide, barium titanate, strontium titanate, lead zirconate titanate, and barium titanate is substituted with calcium, strontium, yttrium, neodymium, samarium, dysprosium, or other alkaline earth metal, zirconium, or rare earth metals. Titanium oxide, barium titanate, zirconate titanate barium calcium, and strontium titanate are more preferable, and titanium oxide and barium titanate are even more preferable.

In particular, at least a portion of the dielectric inorganic fine particles are particularly preferably dielectric inorganic fine particles with a specific dielectric constant at room temperature at 1 kHz of 10 or more. Note that the upper limit of the preferable size (average primary particle size) of the inorganic fine particles is 20,000 nm (20 µm), but more preferably 10,000 nm (10 µm), when considering the processability into a thin film for a transducer described later. Using the dielectric inorganic fine particles may further improve the mechanical properties and/or the electrical properties, and particularly the specific dielectric constant, of the organopolysiloxane cured product.

The conductive inorganic fine particles are not particularly limited so long as conductivity can be applied to the organopolysiloxane cured product. Specific examples thereof include: conductive carbon black, graphite, vapor phase growth carbon (VGCF), and other conductive carbons; and metal powders of platinum, gold, silver, copper, nickel, tin, zinc, iron, aluminum, and the like. Further examples include: antimony-doped tin oxide, phosphorous-doped tin oxide, needle shaped titanium oxide the surface of which is coated with tin oxide/antimony, tin oxide, indium oxide, antimony oxide, zinc antimonate, and pigments obtained by coating tin oxide, and the like on a whisker surface of carbon or graphite; pigments obtained by coating at least one conductive metal oxide selected from a group consisting of tin-doped indium oxide (ITO), fluorine-doped tin oxide (FTO), phosphorous-doped tin oxide, and nickel oxide; pigments having conductivity containing tin oxide and phosphorus on the surface of titanium dioxide particles; and the like. These may be treated with the various surface treating agents described later. These may be used independently, or two or more may be used in combination.

Furthermore, the conductive inorganic fine particles may be obtained by coating a conductive material such as a metal or the like on the surface of fibers such as glass fibers, silica alumina fibers, alumina fibers, carbon fibers, and the like, needle shaped reinforcing materials such as aluminum borate whiskers, potassium titanate whiskers, and the like, or inorganic filling materials such as glass beads, talc, mica, graphite, wollastonite, dolomite, and the like.

Insulating inorganic fine particles that can used in the present invention are not limited so long as the insulating inorganic materials are generally known, in other words, particles of inorganic materials having a volume resistivity of $10^{10}$ to $10^{18}$ $\Omega \cdot$cm. The shape thereof can be any shape such as a particle shape, flake shape, or fiber shape (including whiskers). Specific examples thereof include ceramic spherical particles, plate shaped particles, and fibers. Preferably used examples thereof include metal silicates such as alumina, iron oxide, copper oxide, mica, talc, and the like, and particles such as quartz, amorphous silica, glass, and the like. Furthermore, these may be treated with various surface treating agents described later. These may be used independently, or two or more may be used in combination. When the insulating inorganic fine particles are added to the composition, the dynamic strength and dielectric breakdown strength of the organopolysiloxane cured product can be increased, and an increase in the specific dielectric constant may also be observed.

The amount of the insulating inorganic particles added is preferably within a range of 0.1 to 20 mass %, and more preferably 0.1 to 5 mass %, with regard to the curable organopolysiloxane composition, based on the application. If the added amount is outside the aforementioned preferred range, the effect of adding may not be obtained, or the dynamic strength of the organopolysiloxane cured product may be reduced.

Examples of thermally conductive inorganic fine particles that can be used in the present invention include: metal oxide particles such as magnesium oxide, zinc oxide, nickel oxide, vanadium oxide, copper oxide, iron oxide, silver oxide, and the like; and inorganic compound particles such as aluminum nitride, boron nitride, silicon carbide, silicon nitride, boron carbide, titanium carbide, diamond, diamond-like carbon, and the like. Zinc oxide, boron nitride, silicon carbide, and silicon nitride are preferable. When one or more of the thermally conductive inorganic fine particles is added to the composition, the thermal conductivity of the organopolysiloxane cured product can be increased.

The average particle size of the inorganic particles can be measured by a normal measurement method that is used in the field. For example, if the average particle size is approximately 50 nm or larger and 500 nm or less, the particle size is measured by observation using a microscope such as a transmission type electron microscope (TEM), a field emission type transmission electron microscope (FE-TEM), a scanning type electron microscope (SEM), a field emission type scanning electron microscope (FE-SEM), or the like, such that the average value can be obtained as a measure of the average primary particle size. On the other hand, if the average particle size is approximately 500 nm or more, the value of the average primary particle size can be directly obtained using a laser diffraction/scattering type particle size distribution measuring device or the like.

[Other Optional Components]

The curable organopolysiloxane composition according to the present invention can contain an additive, adhesion improving agent, or the like in order to further improve mold releasability or dielectric breakdown properties.

A film-like or sheet-like cured product obtained by curing the curable organopolysiloxane composition according to the present invention into a thin film can be preferably utilized for an adhesive film and an electroactive film (dielectric layer or electrode layer) forming a transducer. However, if the mold releasability of the cured layer is inferior when forming a thin film, when an organopolysiloxane cured film is manufactured at a particularly high speed, the film may be damaged due to mold releasing. Furthermore, in a dielectric layer used in an actuator, touch panel, or the like, the adhesion may need to be reduced in order to improve sensitivity at low pressure. The curable organopolysiloxane composition of the present invention can improve the manufacturing speed of the film without damaging the film, and the pressure-sensitive adhesion may be further reduced by adding another mold release agent.

Examples of mold releasability improving additives (mold release agents) that can be applied to the curable organopolysiloxane composition of the present invention include carboxylic acid based mold release agents, ester based mold release agents, ether based mold release agents, ketone based mold release agents, alcohol based mold release agents, and the like. One type thereof may be used independently, or two or more types thereof may be used in combination. Furthermore, examples of the mold release agents that can be used include mold release agents not containing silicon atoms, mold release agents containing silicon atoms, and mixtures thereof. Specific examples include those proposed in the aforementioned WO2014/105959.

The dielectric breakdown properties improving agent is preferably an electrical insulation improving agent and can be selected from a group consisting of hydroxides and salts of aluminum or magnesium, clay mineral, and mixtures thereof, specifically, aluminum silicate, aluminum sulfate, aluminum hydroxide, magnesium hydroxide, fired clay, montmorillonite, hydrotalcite, talc, and mixtures thereof. Furthermore, the insulation improving agent may be treated by a known surface treatment method. Specific example include those proposed in the aforementioned WO2014/105959.

The adhesion improving agent is for improving adhesion to a substrate where the curable organopolysiloxane composition of the present invention is in contact during curing. If the dielectric layer serving as the cured product of the composition will not be re-peeled, it will be an effective additive. Examples of adhesion improving agents include vinyltriethoxysilane, allyltrimethoxysilane, allyltriethoxysilane, 3-glycidoxypropyltrimethoxysilane, 3-methacryloxypropyltrimethoxysilane, and other organic functional alkoxysilane compounds, and siloxane derivatives thereof, particularly chain or three dimensional resinous siloxane derivatives substituted with an organic group containing fluorine. Particularly preferred examples of the adhesion improving agent include one or more types selected from:
(g1) reaction mixtures between an organoalkoxysilane containing an amino group and organoalkoxysilane containing an epoxy group;
(g2) an organic compound having at least two alkoxysilyl groups per one molecule, in addition to containing bonds other than a silicon-oxygen bond between these silyl groups;
(g3) a silane containing an epoxy group expressed by general formula:

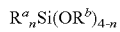

$R^a{}_n Si(OR^b)_{4-n}$ (where $R^a$ represents an organic group containing a monovalent epoxy group, $R^b$ represents an alkyl group having a carbon number of 1 to 6, or a hydrogen atom. n represents a number within a range of 1 to 3),
or a partially hydrolyzed condensate thereof; and
(g4) an alkoxysilane (except those having an organic group containing an epoxy group), or a partially hydrolyzed condensate thereof;
and the like.

So long as a technical effect of the present invention is not impaired, examples of other optional components include: phenol based antioxidants, quinone based antioxidants, amine based antioxidants, phosphorus based antioxidants, phosphite based antioxidants, sulfur based antioxidants, thioether based antioxidants, and other antioxidants; triazole based light stabilizers, benzophenone based light stabilizers, and other light stabilizers; phosphoric ester based flame retardants, halogen based flame retardants, phosphorus based flame retardants, antimony based flame retardants, and other flame retardants; one or more antistatic agents including cation based surfactants, anion based surfactants, non-ionic surfactants, and the like; dyes; pigments; and the like.

The curable organopolysiloxane composition of the present invention can be prepared by uniformly mixing a curable organopolysiloxane and a component promoting a curing reaction, preferably components (A) to (C), and by adding and uniformly mixing another optional component if necessary. Mixing at ambient temperature may be performed using various stirrers or kneaders. Mixing under heat may be performed when combining components that are not cured during mixing.

So long as curing does not occur during mixing, the adding order of the components is not particularly limited. When not used immediately after mixing, a crosslinking agent (for example, component (B)) and a curing reaction promoting component (for example, component (C)) may be stored separately in a plurality of containers so as to not be present in the same container, and the components in all containers may be mixed immediately before use.

The curing reaction of the curable organopolysiloxane composition of the present invention proceeds at room temperature for a curing reaction based on condensation reactions such as dehydration, de-alcoholization, and the like. However, when an organopolysiloxane cured film is produced by an industrial production process, the curing reaction is normally achieved by heating the composition or exposing the composition to active energy rays. The curing reaction temperature by heating is not particularly limited, but is preferably 50° C. or higher and 200° C. or lower, more preferably 60° C. or higher and 200° C. or lower, and even more preferably 80° C. or higher and 180° C. or lower. Furthermore, the time for the curing reaction is dependent on the structure of the aforementioned components (A), (B), and (C) and is normally 1 second or more and 3 hours or less. Generally, the cured product can be obtained by maintaining for 10 second to 30 minutes within a range of 90 to 180° C. Note that the film manufacturing method, rolling process, and the like will be described later.

Examples of active energy rays that may be used in the curing reaction include ultraviolet rays, electron beams, radiation, and the like. Ultraviolet rays are preferable from the perspective of practicality. If the curing reaction is performed using ultraviolet rays, a catalyst for the hydrosilylation reaction having high activity to ultraviolet rays is used, for example, a bis(2,4-pentanedionato)platinum complex or a (methylcyclopentadienyl)trimethylplatinum complex is preferably added. The ultraviolet ray generating source is preferably a high pressure mercury lamp, a medium pressure mercury lamp, an Xe—Hg lamp, a deep UV lamp, or the like. The irradiation amount in this case is preferably 100 to 8,000 mJ/cm$^2$.

[Method of Manufacturing an Organopolysiloxane Cured Film]

The organopolysiloxane cured film of the present invention is a high precision functional film that essentially does not contain fine defects on the surface or inside, and is a flat film that essentially does not have macroscopic unevenness. The organopolysiloxane cured film is preferably manufactured in a clean room to avoid adhesion of airborne dust and the like to the surface and inside.

The organopolysiloxane cured film of the present invention can be preferably obtained by curing the curable organopolysiloxane composition in a condition sandwiched between separators having a release layer. Similarly, the organopolysiloxane cured film of the present invention can be preferably achieved by coating the curable organopolysiloxane composition into a film shape, rolling, and then curing into a film shape by heating or the like. Note that the organopolysiloxane cured film of the present invention itself may be further rolled, or the coated or cured film may be further rolled between the separators provided with a release layer. Structures and manufacturing methods thereof will be described below.

The curable organopolysiloxane composition can be coated onto a film-like substrate, tape-like substrate, or sheet-like substrate (hereinafter, referred to as "film-like substrate), and then cured by a method corresponding to a curing mechanism thereof to form the organopolysiloxane cured film of the present invention on a surface of the substrate.

The substrate is particularly preferably a flat substrate having a release surface, and the curable organopolysiloxane composition is preferably coated on the release surface. The substrate functions as a separator. Therefore, the organopolysiloxane cured film of the present invention laminated on the substrate can be smoothly separated from the release layer with a slight force and adhered to an electronic device or the like, and thus has an advantage of excellent handling workability.

Examples of types of substrates include paperboard, cardboard paper, clay-coated papers, polyolefin laminate papers, particularly polyethylene laminate papers, synthetic resin films and sheets, natural fiber woven materials, synthetic fiber woven materials, artificial leather woven materials, and metal foils. Synthetic resin films and sheets are particularly preferable, and examples of synthetic resins include polyimide, polyethylene, polypropylene, polystyrene, polyvinyl chloride, polyvinylidene chloride, polycarbonate, polyethylene terephthalate, and nylon. When heat resistance is required, a heat-resistant synthetic resin film such as a polyimide, polyetheretherketone, polyethylene naphthalate (PEN), liquid crystal polyacrylate, polyamide-imide, polyether sulfone, and the like is particularly preferable. On the other hand, for applications such as a display device where visibility is required, a transparent substrate and specifically a transparent material such as a polypropylene, polystyrene, polyvinylidene chloride, polycarbonate, polyethylene terephthalate, PEN, and the like is preferable.

The substrate is preferably a film-like or a sheet-like substrate. The thickness thereof is not particularly limited, but is normally approximately 5 to 300 μm. Furthermore, in order to improve adhesion between a supporting film and pressure-sensitive adhesive layer, a supporting film subjected to a primer treatment, corona treatment, etching treatment, or plasma treatment may be used. Furthermore, an opposite surface of the film-like substrate from the pressure-sensitive adhesive layer surface may be subjected to a surface treatment such as a treatment for scratch prevention, grime prevention, fingerprint adhesion prevention, anti-glare, anti-reflection, anti-static, or other treatment.

The method of coating the curable organopolysiloxane composition of the organopolysiloxane cured film of the present invention can be, without limitation, gravure coating, offset gravure coating, offset gravure coating, roll coating using an offset transfer roll coater or the like, reverse roll coating, air knife coating, curtain coating using a curtain flow coater or the like, comma coating, Meyer bar, or other conventionally known methods used for the purpose of forming a layer.

If the organopolysiloxane cured film of the present invention is an adhesive layer (including pressure-sensitive adhesive layer) or an electroactive film (including dielectric films such as a dielectric layer and the like), the cured layer is preferably handled as a laminated body film laminated in a releasable condition onto a film substrate provided with a release layer having release coating performance.

[Manufacturing Method Using Rolling Process]

A high dielectric film of the present invention is particularly preferably obtained by coating the curable organopolysiloxane composition on a substrate, and then rolling, before or after a curing reaction. The rolling process can be performed on the organopolysiloxane cured film in a cured or semi-cured condition, but a flat and uniform organopolysiloxane cured film is preferably obtained by rolling an uncured curable organopolysiloxane composition and then cured by heating or the like. Furthermore, when performing the rolling process, a flat and uniform organopolysiloxane cured film is particularly preferably obtained by rolling an entire laminated body where the uncured curable organopolysiloxane composition is coated between separators having a release layer described later, and then curing by heating or the like.

The amount of the curable organopolysiloxane composition coated onto the substrate must be such that the average thickness of the film after curing is 1 to 200 μm, and is a thickness where rolling is possible.

The rolling process can be performed by coating the curable organopolysiloxane composition onto a substrate and using a well-known rolling method such as roller rolling or the like. Note that the cured or semi-cured organopolysiloxane cured product may be essentially molded into a sheet if necessary and then rolled. For the organopolysiloxane cured film after rolling, the average thickness of the film must be within a range of 1 to 200 μm. In particular, roller rolling has an advantage where the organopolysiloxane cured film with a desired thickness can be designed by adjusting a gap between rollers. For example, an organopolysiloxane cured film having excellent flatness and very few defects on the film surface and inside the film can be obtained by adjusting the gap between the rollers to a constant level where the average thickness is within a range of 1 to 200 μm, and then rolling. More specifically, for roller rolling, the gap between the rollers is particularly preferably adjusted to be within a range of 2.0 to 4.0 times the average thickness of the target organopolysiloxane cured film. For example, when a 50 μm organopolysiloxane cured film is obtained, the thickness of the release layer is particularly preferably within a range of 100 to 200 μm. When the gap is wider than the aforementioned upper limit, a void originating from air bubbles may not be sufficiently eliminated in particular, and defects on the film surface and inside the film may increase.

As described above, the rolling process is preferably performed in an uncured condition by coating the curable organopolysiloxane composition onto the substrate. Specifically, the curable organopolysiloxane composition, which is a raw material, can be preferably coated onto a sheet-like substrate provided with a release layer and rolled by roller rolling or the like, and then the flattened curable organopolysiloxane composition can be cured by heating or the like to obtain the organopolysiloxane cured film of the present invention.

The method of coating the curable organopolysiloxane composition before rolling onto the substrate, and the like are the same as described above, and an organopolysiloxane cured product containing a fluoroalkyl group having the aforementioned primer layer and flattening layer may be subjected to a rolling process such as roller rolling or the like.

[Manufacturing Method Using Curing Between Separators Having Release Layer]

The organopolysiloxane cured film of the present invention can be preferably obtained by applying a substrate having a release layer on a coating surface of the curable organopolysiloxane composition, sandwiching the uncured coating surface between substrates (separators), and forming a physically uniformed flattening layer. Note that when forming the flattening layer, a laminated body obtained by coating the uncured curable organopolysiloxane composition between separators having a release layer is preferably rolled using a well-known rolling method such as roller rolling or the like. In particular, the thickness of the release layer on the separators is particularly preferably within a range of 0.1 to 1.5 times the average thickness of the target organopolysiloxane cured film. For example, when a 50 µm organopolysiloxane cured film is obtained, the thickness of the release layers is particularly preferably within a range of 5 to 75 µm. When the release layer is thicker than the aforementioned upper limit, the releasing force with regard to the film may be high, voids originating from air bubbles may be particularly more likely to occur, and defects on the film surface and inside the film may increase.

[Use of Organopolysiloxane Cured Film]

The organopolysiloxane cured film of the present invention has very few fine defects (voids originating from air bubbles, contaminated sites due to dust or airborne dust) on the film surface and inside the film. Therefore, dielectric breakdown at these voids will not easily occur when the film is electrified by applying a high voltage, the film as a whole can achieve high dielectric breakdown strength, and can also achieve adhesion/pressure-sensitive adhesion as desired, in addition to transparency and flatness. Therefore, the organopolysiloxane cured film of the present invention is useful as an electronic material, member for a displaying device, member for a transducer (including sensors, speakers, actuators, and generators), and can be particularly preferably used as an adhesive/pressure-sensitive adhesive film, an electroactive film (including high dielectric films), an electronic component or a member for a displaying device. In particular, a transparent adhesive film or electroactive film is preferable as a member for a display panel or display, and is particularly useful in so-called touch panel applications where an apparatus and particularly an electronic apparatus can be operated by touching a screen with a fingertip or the like. Similarly, an electroactive film with high dielectric breakdown strength is preferred in members for a transducer such as an actuator or the like in the form of a single layer or a laminated film, and is particularly useful in applications for an actuator activated under high voltage.

INDUSTRIAL APPLICABILITY

The application of the organopolysiloxane cured film of the present invention is not limited to those disclosed above, and can be used in various flat panel displays (FPD) for displaying characters, symbols, or images, such as television receivers, monitors for a computer, monitors for a mobile information terminal, monitors for monitoring, video cameras, digital cameras, mobile phones, mobile information terminals, displays for an instrument panel of an automobile and the like, displays for an instrument panel of various equipment, devices, and equipment, automatic ticket machines, automatic teller machines, and the like. Application is possible as a device for CRT displays, liquid crystal displays, plasma displays, organic EL displays, inorganic EL displays, LED displays, surface electrolytic displays (SEDs), field emitting displays (FEDs), and other displaying devices, or touch panels using the displaying devices. Similarly, the organopolysiloxane cured film of the present invention is a film-like or sheet-like member with excellent mechanical properties and electrical properties including dielectric breakdown strength, and has high specific dielectric constant and mechanical strength (specifically tensile strength, tear strength, elongation rate, and the like) if necessary. Therefore, the organopolysiloxane cured film can be used as an electronic material, member for a displaying device, or member for a transducer (including sensors, speakers, actuators, and generators), and can be particularly preferably used as an electroactive film (dielectric layer or electrode layer) forming a transducer. A specific method of use where a well-known method using a dielectric layer or pressure-sensitive adhesive layer can be used without limitation.

EXAMPLES

The present invention will be described below by way of examples, but the present invention is not limited thereto. The following compounds were used in the Examples and Comparative Example described below.

Component (a1): Dimethylsiloxane polymer (amount of vinyl groups (mass %): 0.09, siloxane polymerization degree: 835) blocked at both ends with a vinyldimethylsiloxy group Component (a2): Dimethylsiloxane polymer (amount of vinyl groups (wt %): 0.22, siloxane polymerization degree: approximately 335) blocked at both ends with a vinyldimethylsiloxy group Component (a3): Siloxane resin containing a vinyldimethylsiloxy unit (MVi unit) expressed by $CH_2$=CH $(CH_3)_2SiO_{0.5}$, a trimethylsiloxy unit (M unit) expressed by $(CH_3)_3SiO_{0.5}$, and a siloxy unit (Q unit) represented by $SiO_{2.0}$, where the amount of vinyl groups (mass %) is 2.40

Component (a4): 3,3,3-trifluoropropylmethyl, dimethylsiloxane copolymer (amount of vinyl groups: 0.26 mass %, siloxane polymerization degree: 193) blocked at both ends with a vinyldimethylsiloxy group Component (a5): 3,3,3-trifluoropropylmethyl, dimethylsiloxane copolymer (amount of vinyl groups: 0.21 mass %, siloxane polymerization degree: 246) blocked at both ends with a vinyldimethylsiloxy group Component (b): Dimethylsiloxane/methylhydrogen siloxane copolymer (amount of silicon-bonded hydrogens (wt %) is approximately 0.78) blocked at both ends with a trimethylsiloxy group Component (b2): Dimethylsiloxane/3,3,3-trifluoropropylmethylsiloxane/methylhydrogen siloxane copolymer (amount of silicon-bonded hydrogens (mass %) is approximately 0.22) blocked at both ends with a trimethylsiloxy group Component (b3): Dimethylsiloxane/3,3,3-trifluoropropylmethylsiloxane copolymer (amount of silicon-bonded hydrogens (mass %) is approximately 0.015) blocked at both ends with a dimethyhydrosiloxy group Component (c): Dimethyl siloxane polymer solution blocked at both ends with a vinyl dimethyl siloxy group (approximately 0.6 wt % in platinum concentration) of a platinum-1,3-divinyl 1,1,3,3-tetramethyldisiloxane complex Component (d). Fumed silica treated hexamethyldisilazane (product name: RDX200, manufactured by Evonik)

Component (d2). Fumed silica treated with hexamethyldisilazane and 1,3-bis(3,3,3-trifluoropropyl)-1,1,3,3-tetramethyldisilazane (product name before treatment: AEROSIL® 200)

Component (d3). Fumed silica treated with hexamethyldisilazane and 1,3-bis(3,3,3-trifluoropropyl)-1,1,3,3-tetramethyldisilazane (product name before treatment: AEROSIL® 50)

Component (e): Adhesion improving agent (=reaction product of a dimethylsiloxane-methylvinylsiloxane copolymer and glycidoxypropyl trimethoxysilane, blocked at both ends with a hydroxydimethylsiloxy group (amount of vinyl groups (mass %) is approximately 5.6))

<Hydrosilylation Reaction Inhibitor>

Component (f): 1,3,5,7-tetramethyl-1,3,5,7-tetravinyl-cyclotetrasiloxane

Example 1

A liquid curable organopolysiloxane composition 1 was prepared by adding the aforementioned component (a1) at 66.48 wt. %, component (a2) at 15.41 wt %, component (a3) at 5.08 wt %, component (b) at 2.46 wt %, component (c) at 0.21 wt %, component (d) at 9.18 wt %, and component (e) at 1.18 wt %. At this time, the silicon atom-bonded hydrogen atoms of component (b) were used at an amount of approximately 1.6 mols per 1 mol of vinyl groups in the composition.

Furthermore, the liquid curable organopolysiloxane composition 1 was coated and sandwiched between polyethylene terephthalate films provided with a 50 μm thick release layer in a clean room, rolled through two stainless steel rollers adjusted at a clearance of 150 μm, and then cured by heating for approximately 3 minutes in a hot air circulating oven at 95° C. The thickness of the obtained cured product was 50 μm, and a flattened film-like cured product (=organopolysiloxane cured film 1) was obtained.

Example 2

A liquid curable organopolysiloxane composition was prepared by adding the aforementioned component (a4) at 65.44 wt. %, component (a5) at 2.63 wt %, component (b2) at 5.21 wt %, component (b3) at 5.21 wt %, component (c) at 0.10 wt %, component (d2) at 18.80 wt %, component (d3) at 2.33 wt %, and component (f) at 0.28 wt %. At this time, the silicon atom-bonded hydrogen atoms of component (b) were used at an amount of approximately 1.2 mols per 1 mol of vinyl groups in the composition.

Furthermore, the liquid curable organopolysiloxane composition 2 was coated and sandwiched between two polyethylene terephthalate films provided with a 245 μm thick release layer in clean conditions, rolled through two stainless steel rollers adjusted at a clearance of 590 μm, and then cured by heating for approximately 60 minutes in a hot air circulating oven at 110° C. The thickness of the obtained cured product was 100 μm, and a flattened film-like cured product (=organopolysiloxane cured film 2) was obtained.

Comparative Example 1

The liquid curable organopolysiloxane composition 1 was prepared similarly to Example 1, and the composition was coated and sandwiched between a polyethylene terephthalate film provided with a 100 μm thick release layer outside of a clean room, rolled through two stainless steel rollers adjusted at a clearance of 250 μm, and then cured by heating for approximately 30 minutes in a hot air circulating oven at 100° C. The thickness of the obtained cured product was 50 μm, and a flattened film-like cured product (=organopolysiloxane cured film C1) was obtained.

[Evaluation]

The dielectric breakdown strength and the number of defects on the surface/inside of the film of the organopolysiloxane cured films in the Examples and Comparative Example were measured by the following methods. The results are shown in Table 1.

<Measurement of Dielectric Breakdown Strength>

Measurements were performed using an electrical insulating oil breakdown voltage testing device PORTATEST 100A-2 manufactured by Soken Electric Co., Ltd. At this time, 40 points were measured for both Example 1 and Comparative Example 1 using the curable organopolysiloxane composition 1. The average values thereof and the standard deviation are shown in Table 1. Furthermore, 16 points were measured for Example 2 using the curable organopolysiloxane composition 2. The average values thereof and the standard deviation are shown in Table 1.

<Measurement of Number of Defects>

Measurements were performed using MaxEye. Impact manufactured by Futek Inc. A white LED was used as a light source. The lens was a Nikon F4.0/f95, the line speed was 10 m/min, the width resolution was 0.01 mm/pixel, and the flow resolution was 0.01 mm/scan.

Internal defects were measured under transmission conditions from a lower portion of the film. At this time, the light projecting distance between the light source and the film was 100 mm, and the light receiving distance between the film and the camera was 367 mm.

Surface defects were measured by diagonally irradiating light sources from an upper portion of the film surface under reflective conditions. At this time, the light projecting distance and light receiving distance were the same as internal defect measurements, and the light projecting angle and light receiving angle were both set to 60°.

A base level was set to 256 for both internal and surface defects, and threshold values were measured to be 35 for internal defects and 40 for surface defects. The number of defects in a 15 mm×15 mm square in a plane of the films prepared as described above is shown below.

TABLE 1

| Film | Number of internal defects/ defects | Number of surface defects/ defects | Dielectric breakdown strength/ V/μm | Standard deviation/ V/μm |
| --- | --- | --- | --- | --- |
| Example 1 | 13 | 0 | 73.9 | 4.4 |
| Example 2 | 18 | 0 | 64.0 | 3.0 |
| Comparative Example 1 | 98 | 6 | 59.4 | 13.5 |

As is clear in Table 1, the organopolysiloxane cured film 1 according to Example 1, where (i) in a clean room, (ii) the curable organopolysiloxane composition was coated and sandwiched between substrate films having a thin release layer at 50 μm, (iii) rolled between rollers with an adjusted clearance, and then heat cured, had a very low number of defects on the film surface and inside the film as compared to the film C1 obtained by a normal method (Comparative Example). The dielectric breakdown strength and variations thereof were also significantly improved. Both films were derived from the same curable organopolysiloxane composition and also had an average thickness of 50 μm (common). Therefore, the improvements of the electrical properties and the like are thought to be due to the low number of defects on the film surface and inside the film in the Examples.

Furthermore, as for the organopolysiloxane cured film 2 having a dielectric functional group according to Example 2, the number of defects on the film surface and inside the film was very low, and the dielectric breakdown strength and variation thereof were also low. Therefore, the number of defects on the film surface and inside the film was thought to have a significant effect on electrical properties and the like for an organopolysiloxane cured film having a dielectric functional group.

The invention claimed is:

1. An organopolysiloxane cured film having an average thickness within a range of 1 to 200 μm, wherein a number of surface defects is within a range of 0 to 1 when measuring the number of surface defects using an optical means in an arbitrary position on the organopolysiloxane cured film with a unit area of 15 mm×15 mm, wherein the organopolysiloxane cured film is obtained by curing a curable organopolysiloxane composition, and wherein the curable organopolysiloxane composition comprises:
    (A) an organopolysiloxane mixture, containing:
        (a1) a straight chain or branched chain organopolysiloxane having an alkenyl group only at an end of a molecular chain; and
        (a2) an organopolysiloxane resin containing an alkenyl group having at least one branched siloxane unit in a molecule wherein the amount of vinyl ($CH_2=CH-$) groups is within a range of 1.0 to 5.0 mass %;
    (B) an organohydrogenpolysiloxane composition having at least two silicon-bonded hydrogen atoms in a molecule in an amount containing 0.1 to 2.5 moles of silicon-bonded hydrogen atoms with regard to a total amount of 1 mol of the carbon-carbon bonds in the composition; and
    (C) an effective amount of a hydrosilylation reaction catalyst.

2. The organopolysiloxane cured film according to claim 1, wherein a number of internal defects is within a range of 0 to 20 when measuring the number of internal defects using an optical means in an arbitrary position on the organopolysiloxane cured film with a unit area of 15 mm×15 mm.

3. The organopolysiloxane cured film according to claim 1, wherein a dielectric breakdown strength measured at room temperature is within a range of 60 V/μm to 200 V/μm.

4. The organopolysiloxane cured film according to claim 1, which is transparent, and wherein the average thickness is within a range of 1 to 150 μm.

5. The organopolysiloxane cured film according to claim 1, obtained by a rolling process or step.

6. The organopolysiloxane cured film according to claim 1, having a flattened surface obtained by curing between separators having a release layer.

7. The organopolysiloxane cured film according to claim 1, obtained by curing the curable organopolysiloxane composition in a clean room.

8. An electronic material or a member for a displaying device comprising or formed from the organopolysiloxane cured film according to claim 1.

9. A laminated body having a structure where the organopolysiloxane cured film according to claim 1 is laminated onto a sheet-like substrate provided with a release layer.

10. An electronic component or displaying device, comprising the organopolysiloxane cured film according to claim 1.

11. A method of manufacturing the organopolysiloxane cured film according to claim 1, the method comprising a step of applying the curable organopolysiloxane composition onto a substrate and then performing a rolling process or step prior to or after curing of the curable organopolysiloxane composition.

12. A method of manufacturing the organopolysiloxane cured film according to claim 1, the method comprising a step of curing the curable organopolysiloxane composition while sandwiched between separators having a release layer.

13. The method according to claim 11, wherein the rolling process or step occurs in a clean room.

14. The method according to claim 12, wherein the step of curing occurs in a clean room.

* * * * *